US012560536B2

(12) United States Patent  
Takahashi et al.

(10) Patent No.: US 12,560,536 B2  
(45) Date of Patent: Feb. 24, 2026

(54) GAS ANALYSIS DEVICE AND LASER LIGHT TRANSMISSION MECHANISM

(71) Applicant: HORIBA STEC, Co., Ltd., Kyoto (JP)

(72) Inventors: Motonobu Takahashi, Kyoto (JP); Takeshi Akamatsu, Kyoto (JP); Masahiro Nakane, Kyoto (JP); Kenji Hara, Kyoto (JP); Kyoji Shibuya, Kyoto (JP)

(73) Assignee: HORIBA STEC, CO., LTD., Kyoto (JP)

( * ) Notice: Subject to any disclaimer, the term of this patent is extended or adjusted under 35 U.S.C. 154(b) by 181 days.

(21) Appl. No.: 18/287,544

(22) PCT Filed: Mar. 16, 2022

(86) PCT No.: PCT/JP2022/011790  
§ 371 (c)(1),  
(2) Date: Oct. 19, 2023

(87) PCT Pub. No.: WO2022/259680  
PCT Pub. Date: Dec. 15, 2022

(65) Prior Publication Data

US 2024/0201078 A1     Jun. 20, 2024

(30) Foreign Application Priority Data

Jun. 8, 2021     (JP) .................................. 2021-096203

(51) Int. Cl.  
*G01N 21/3504* (2014.01)  
*G01N 21/35* (2014.01)

(52) U.S. Cl.  
CPC . *G01N 21/3504* (2013.01); *G01N 2021/3595* (2013.01); *G01N 2201/0233* (2013.01);  
(Continued)

(58) Field of Classification Search  
CPC ........... G01N 21/3504; G01N 21/0303; G01N 21/031; G01N 21/0332  
See application file for complete search history.

(56) References Cited

U.S. PATENT DOCUMENTS

| | | | | |
|---|---|---|---|---|
| 2011/0123152 A1* | 5/2011 | Bicknell | ................ | G02B 6/125 |
| | | | | 385/36 |
| 2021/0103098 A1 | 4/2021 | Haase et al. | | |
| 2022/0170849 A1 | 6/2022 | Nagase et al. | | |

FOREIGN PATENT DOCUMENTS

| | | |
|---|---|---|
| CN | 107621459 | 1/2018 |
| JP | 2011-523714 | 8/2011 |

(Continued)

OTHER PUBLICATIONS

J. Berhonneau et al., "Understanding the CVD process of (Si)—B—C ceramics through FTIR spectroscopy gas phase analysis," Surface & Coatings Technology 201 (2007) 7273-7285 (Year: 2007).*

(Continued)

*Primary Examiner* — Casey Bryant  
(74) *Attorney, Agent, or Firm* — Greenblum & Bernstein, P.L.C.

(57) ABSTRACT

In order to provide a more practical gas analysis device than that having conventionally been, while keeping the laser source and the photodetector separated from the gas cell, thereby preventing exposure to a high temperature, the gas analysis device includes: a gas cell; a laser source or a photodetector separated from the gas cell; and a laser light transmission mechanism provided between the gas cell and the laser source or the photodetector. The laser light transmission mechanism includes one or a plurality of tubular members, and an inner space of the one or the plurality of tubular members provides a light path for the laser light.

16 Claims, 6 Drawing Sheets

(52) U.S. Cl.
      CPC ................ *G01N 2201/0633* (2013.01); *G01N 2201/0636* (2013.01)

(56) References Cited

FOREIGN PATENT DOCUMENTS

| | | | | | | |
|---|---|---|---|---|---|---|
| JP | 2011523714 | A | * | 8/2011 | ............. | G02B 6/125 |
| JP | 2014-199371 | | | 10/2014 | | |
| JP | 2019-15661 | | | 1/2019 | | |
| JP | 2019015661 | A | * | 1/2019 | | |
| WO | 2009/136948 | | | 11/2009 | | |
| WO | 2019/175702 | | | 9/2019 | | |
| WO | WO-2019175702 | A1 | * | 9/2019 | ........... | G02B 6/3829 |
| WO | 2020/213385 | | | 10/2020 | | |

OTHER PUBLICATIONS

International Search Report Issued in International Patent Application No. PCT/JP2022/011790, dated May 17, 2022, along with an English translation thereof.
Office Action issued in Corresponding TW Patent Application No. 111119234, dated Oct. 8, 2025, along with an English translation thereof.

* cited by examiner

GAS ANALYSIS DEVICE AND LASER LIGHT TRANSMISSION MECHANISM

TECHNICAL FIELD

The present invention relates to a gas analysis device and a laser light transmission mechanism used in the gas analysis device.

BACKGROUND ART

Conventionally, as a gas analysis device used in a semiconductor manufacturing device, there has been a gas analysis device that analyzes a component to be measured contained in a gas using an infrared absorption method, an ultraviolet absorption method, or the like.

Specifically, such a gas analysis device includes a gas cell into which gas is introduced, a laser source that irradiates the gas flowing through the gas cell with laser light, and a photodetector that detects the laser light transmitted through the gas.

In such a gas analysis device, when the gas introduced into the gas cell needs to be kept at a high temperature, the gas cell itself becomes also heated. Therefore, if the laser source and the photodetector are disposed near the gas cell, the laser source and the photodetector also become highly heated, and may causes a measurement error or a failure. Examples of possible countermeasures for such a measurement error and a failure include cooling the gas cell or covering the gas cell with a heat insulating material, which in turn, however, results in an increase in the number of parts.

Therefore, Patent Literature 1 discloses a configuration in which a laser source and a photodetector are separated from a gas cell and connected by an optical fiber, in order to prevent the laser source and the photodetector from being exposed to a high temperature.

However, in the field of semiconductor manufacturing, such a configuration for transmitting laser light using an optical fiber has never been put into practical use so far.

One factor obstructing the practical use is that the transmission characteristics of the optical fiber are susceptible to disturbances such as vibration or bending.

More specifically, in the field of semiconductor manufacturing in which smaller footprints are desirable, various components of a semiconductor manufacturing device, such as pipes where the gas flows, are housed closely inside a casing so that no space is wasted, and therefore, the gas cell may be mounted on the pipe inside the casing. In such a configuration, because the gas is highly heated, convective updraft produced inside the casing or airflows resulting from ventilation for exhausting heat from the casing may cause the optical fiber to vibrate or move, and the transmission characteristics of the optical fiber may change. In such a case, the accuracy of the analysis cannot be ensured.

CITATION LIST

Patent Literature

Patent Literature 1: WO 2020/213385 A

SUMMARY OF INVENTION

Technical Problem

The present invention has been made to solve the problems described above, and a main object of the present invention is to provide a more practical gas analysis device than that having conventionally been, while keeping the laser source and the photodetector separated from the gas cell, thereby preventing exposure to a high temperature.

Solution to Problem

In other words, a gas analysis device according to the present invention includes: a gas cell; a laser source or a photodetector separated from the gas cell; and a laser light transmission mechanism provided between the gas cell and the laser source or the photodetector, in which the laser light transmission mechanism includes one or a plurality of tubular members, and an inner space of the one or the plurality of tubular members provides a light path for laser light.

With such a gas analysis device, since the laser source or the photodetector is separated from the gas cell, even if the gas flowing through the gas cell is highly heated, the laser source or the photodetector can be prevented from being exposed to the high temperature, and the measurement accuracy can be ensured.

Furthermore, even if highly heated gas produces convective updraft inside the casing, or an airflow is generated by the ventilation for exhausting heat from the casing, because the inner space of the tubular member provides the light path for the laser light, it is possible to achieve a highly practical structure that minimizes the change in the laser light transmission characteristics, unlike the conventional configuration using the optical fiber that is caused to vibrate by the convective updraft.

As an example of the embodiment in which the operational effects described above are exerted prominently, there is an embodiment in which the gas cell is heated by a heating mechanism.

Preferably, the laser source or the photodetector separated from the gas cell is separated from a pipe connected to the gas cell.

With this configuration, it is possible to prevent the laser source or the photodetector from being exposed to a high temperature, more reliably.

An example of a more specific embodiment includes an embodiment in which the gas cell is provided inside a casing of a semiconductor manufacturing device.

Preferably, the light path formed by the plurality of tubular members coupled to each other has at least one bend.

With such a configuration, a degree of freedom in the arrangement of the laser source or the photodetector can be improved.

The laser light transmission mechanism preferably includes: a coupling mechanism interposed between the tubular members that are adjacent to each other, and coupling the tubular members; and a reflection mirror provided inside the coupling mechanism.

With such a configuration, it is possible to reflect the laser light in various directions, using the reflection mirror. Therefore, the freedom in the design of the light path of the laser light can be improved.

Preferably, the coupling mechanism has a pair of attachments having the same shape and attached to respective ends of the tubular members that are adjacent to each other, and the reflection mirror is provided inside each attachment included in the pair of attachments.

With such a configuration, because the coupling mechanism is formed by a pair of attachments having the same shape, the manufacturing cost of the coupling mechanism can be reduced.

Preferably, the laser light transmission mechanism includes an optical fiber provided in the inner space of the tubular member, and forming the light path.

With such a configuration, the reflection mirror described above is rendered unnecessary, and the configuration of the laser light transmission mechanism can be simplified.

Preferably, both the laser source and the photodetector are separated from the gas cell, and a plurality of the laser light transmission mechanisms are provided between the gas cell and the laser source and between the gas cell and the photodetector, respectively.

With such a configuration, both the laser source and the photodetector can be prevented from being exposed to the high temperature, and the measurement accuracy can be ensured further.

As an example of the embodiment in which the operational effects described above are exerted more prominently, there is an embodiment in which one or both of the laser source and the photodetector are housed inside the casing.

Preferably, temperature-controlled gas is circulated through or is sealed in the inner space of the tubular member.

With such a configuration, it is possible to control the temperature of the inner space through which the laser light is passed, so that the wavelength and the output of the laser light can be stabilized.

Preferably, a purge gas not containing the component to be measured is circulated through the inner space of the tubular member.

In this manner, it is possible to clean the internal of the tubular member, and to make improvements such as in the maintainability.

Preferably, the inner space of the tubular member is in a vacuum state.

In this manner, the vacuum, which has a heat insulating effect, can suppress the transfer of ambient heat to the internal of the tubular member, so that it is possible to reduce the thermal effect on (thermal fluctuation of) the laser light passing through the tubular member.

Preferably, the laser source further includes a beam splitter that splits laser light from the laser source into a plurality of light paths, and the plurality of tubular members form the plurality of light paths, respectively.

With such a configuration, various light paths can be formed depending on the objective of the analysis, e.g., using one of light paths as a long light path where the light goes through multiple reflections inside the gas cell, and another as a short light path in which the light does not go through multiple reflections.

Further, a laser light transmission mechanism according to the present invention is used in a gas analysis device including a gas cell and a laser source or a photodetector separated from the gas cell, and is a laser light transmission mechanism provided between the gas cell and the laser source or the photodetector, the laser light transmission mechanism including one or a plurality of tubular members, and an inner space of the tubular members provides a light path of laser light.

With a laser light transmission mechanism having the configuration as described above, it is possible to achieve operational effects that are the same as those of the gas analysis device described above.

Advantageous Effects of Invention

According to the present invention described above, it is possible to provide a more practical gas analysis device than that having conventionally been, while keeping the laser source and the photodetector separated from the gas cell, thereby preventing exposure to a high temperature.

REFERENCE SIGNS LIST

Figure 1:
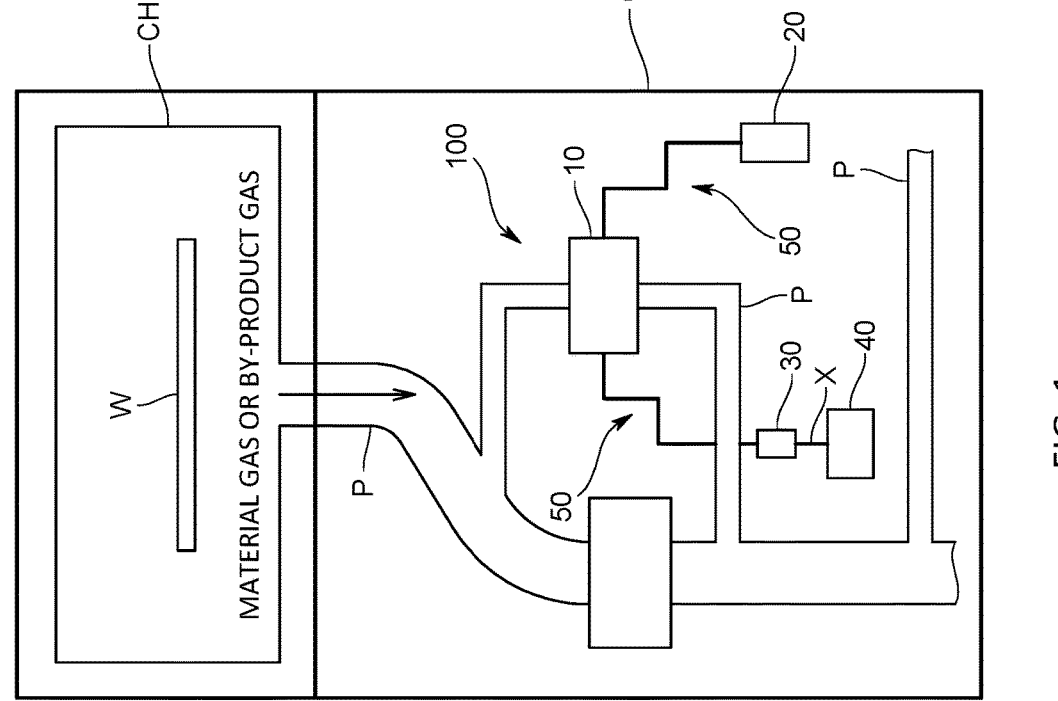
FIG. 1 is a schematic view illustrating a semiconductor manufacturing device in which a gas analysis device according to an embodiment of the present invention is incorporated.
Figure 1:

100 gas analysis device
200 semiconductor manufacturing device
10 gas cell
20 laser source
30 photodetector
40 signal processing unit
50 laser light transmission mechanism
51 tubular member
52 coupling mechanism
521 attachment
53 reflection mirror
P pipe
C casing
L light path

DESCRIPTION OF EMBODIMENT

A gas analysis device according to an embodiment of the present invention will now be explained with reference to some drawings.
<Device Configuration>

As illustrated in FIG. 1, a gas analysis device 100 according to the present embodiment is used in a manner incorporated in a semiconductor manufacturing device 200 that applies plasma processing or the like on a wafer W, for example. Note that the semiconductor manufacturing device 200 includes a processing chamber CH in which a semiconductor manufacturing process is performed, and a plurality of pipes P that are connected to the processing chamber CH. Some or all of the plurality of pipes P are housed inside the casing C.

The gas analysis device 100 measures the concentration or partial pressure of a halide, as a component to be measured contained in a material gas used in a semiconductor manufacturing process or a by-product gas resultant of the semiconductor manufacturing process (hereinafter, these gases are simply referred to as "gas"). Examples of the halides include fluoride, chloride, and bromide. It is also possible for the gas analysis device 100 to be configured to measure components other than halides.

The gas analysis device 100 irradiates the gas with laser light, and detects the laser light transmitted through the gas, to analyze the component to be measured in the gas. In this embodiment, the gas analysis device 100 uses the infrared absorption method in the analysis of the component to be measured, but may also use ultraviolet absorption method in the analysis of the component to be measured.

Specifically, as illustrated in FIG. 1, the gas analysis device 100 includes a gas cell 10 into which gas is introduced, a laser source 20 that irradiates the gas flowing through the gas cell 10 with laser light, a photodetector 30 that detects the laser light transmitted through the gas, and a signal processing unit 40 that acquires an output signal from the photodetector 30 and performs an operation to the output signal. The gas cell 10 is where a gas to be introduced into a processing chamber CH where the semiconductor manufacturing process is carried out, or a gas from the processing chamber CH is guided, and is used in a manner attached to the pipe P through which the gas flows.

As illustrated in FIG. 1, the gas cell 10 according to the present embodiment is mounted on a pipe P communicatively connected to an exhaust port of the processing chamber CH, and is provided inside the casing C together with the pipe P.

Specifically, the gas cell 10 is a multiple reflection cell provided with a pair of reflection mirrors (not illustrated), and multiply-reflects laser light. However, the gas cell 10 is not limited to a multiple reflection cell, and may be a cell through which laser light passes only once. In addition, a heating mechanism (not illustrated) such as a heater using an electric heating wire for heating the inside of the gas cell 10 to a predetermined temperature (for example, 200° C.) is provided around the gas cell 10. Note that the heating mechanism does not necessarily need to be provided.

The laser source 20 is a laser tube that emits a wavelength-modulated laser light, and oscillates, for example, mid-infrared (2.5 μm to 25 μm) laser light. The laser source 20 can modulate the oscillation wavelength within a predetermined wavelength modulation range, using a current (or voltage) given thereto. As long as the oscillation wavelength is variable, it is possible to use another type of laser source, and to change the temperature, for example, to change the oscillation wavelength. In addition, the laser source 20 may be a quantum cascade laser (QCL), which is a type of semiconductor laser, or may emit laser light at a specific wavelength, without limitation to a laser source that emits a wavelength-modulated laser light. The laser source 20 may also be configured to emit ultraviolet laser light, when the gas analysis device 100 is configured to use the ultraviolet absorption in the analysis of the component to be measured, as mentioned earlier.

In this example, as the photodetector 30, a relatively inexpensive thermal photodetector such as a thermopile is used, but it is also possible to use another type of photodetector such as a quantum-well photoelectric element that is highly responsive, such as those using HgCdTe, InGaAs, InAsSb, or PbSe.

The signal processing unit 40 is connected to the photodetector 30 via a cable X, for example, and specifically includes an analog electric circuit that includes elements such as a buffer and an amplifier, a digital electric circuit that includes elements such as a CPU and a memory, and an AD converter, a DA converter, and the like that intermediate the analog electric circuit and the digital electric circuit.

The signal processing unit 40 functions as an operation unit receiving an output signal from the photodetector 30, and performing an operation on the value of the signal, to calculate the concentration or the partial pressure of the component to be measured, by causing the CPU and peripheral devices to cooperate with one another, in accordance with a predetermined program stored in a predetermined area of the memory. Note that the signal processing unit 40 may be configured to further exert a function as a light source control unit that controls the output of the laser source 20.

In the configuration described above, at least one of the laser source 20 and the photodetector 30 is separated from gas cell 10. In this embodiment, as illustrated in FIG. 1, both the laser source 20 and the photodetector 30 are separated from the gas cell 10.

The expression "separated" as used herein refers to being at a position separated from the gas cell 10 by a predetermined distance or more, more specifically, being at a position separated by a distance at which at least the analysis accuracy of the gas analysis device 100 can be ensured, and more preferably, being at a position separated from the gas cell 10 by a distance by which the temperature of the gas flowing through the gas cell 10 substantially has no effect on the measurement accuracy. In other words, in the present embodiment, both of the laser source 20 and the photodetector 30 are disposed at positions substantially not affected by the temperature of the gas flowing through the gas cell 10.

In the present embodiment, as illustrated in FIG. 1, both the laser source 20 and the photodetector 30 are disposed inside the casing C. It is also possible for one or both of the laser source 20 and the photodetector 30 to be disposed outside the casing C.

In addition, in the example explained herein, the laser source 20 and the photodetector 30 are disposed inside a lower part of the casing C, so as to be less affected by the heat. The positioning, however, is not limited thereto, and one or both of the laser source 20 and the photodetector 30 may be disposed in an upper part or a central part of the casing C, for example.

Furthermore, one or both of the laser source 20 and the photodetector 30 are preferably separated from the pipe P that is connected to the gas cell 10, in order to prevent exposure to the high temperature, more reliably.

Figure 2:
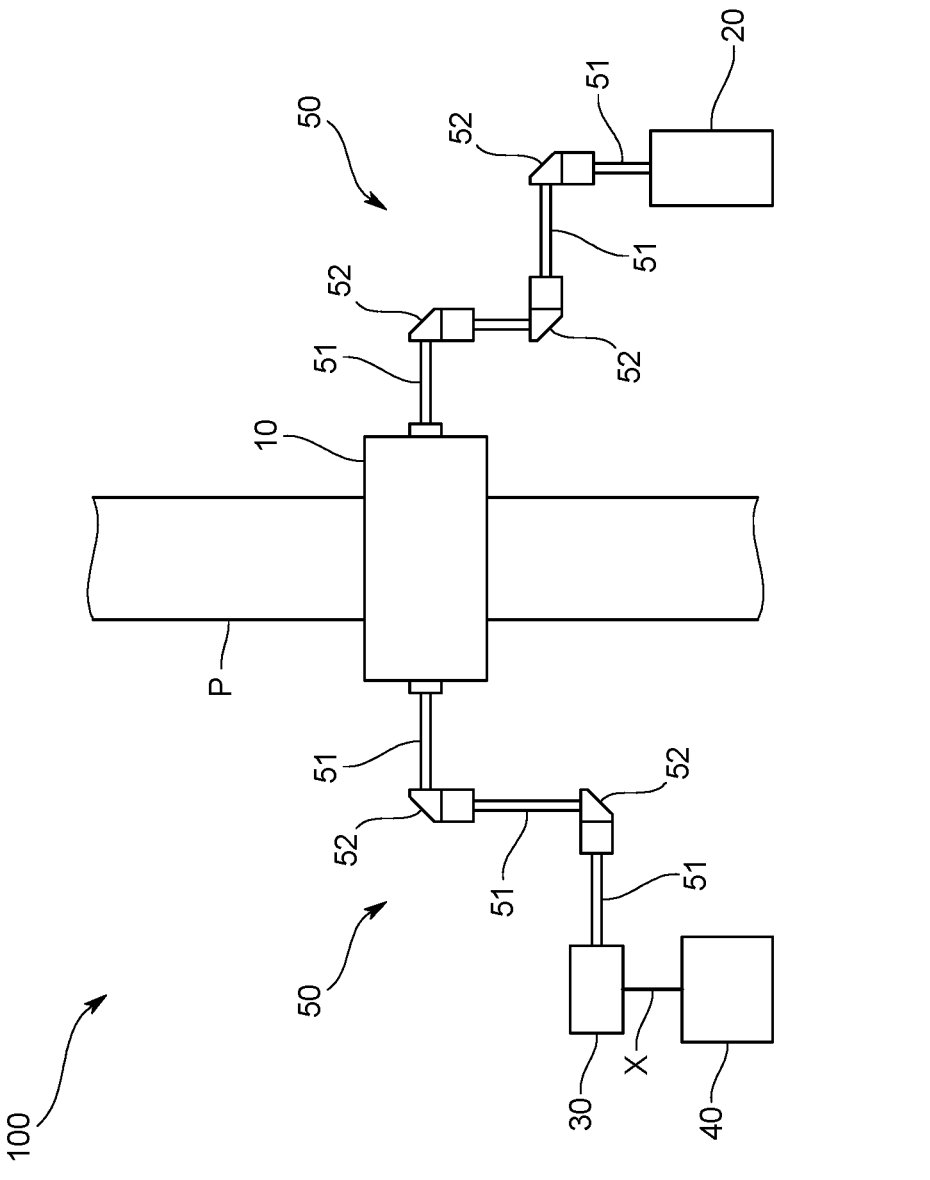
FIG. 2 is a schematic diagram illustrating a laser light transmission mechanism, included in the gas analysis device according to the embodiment.
Figure 3:
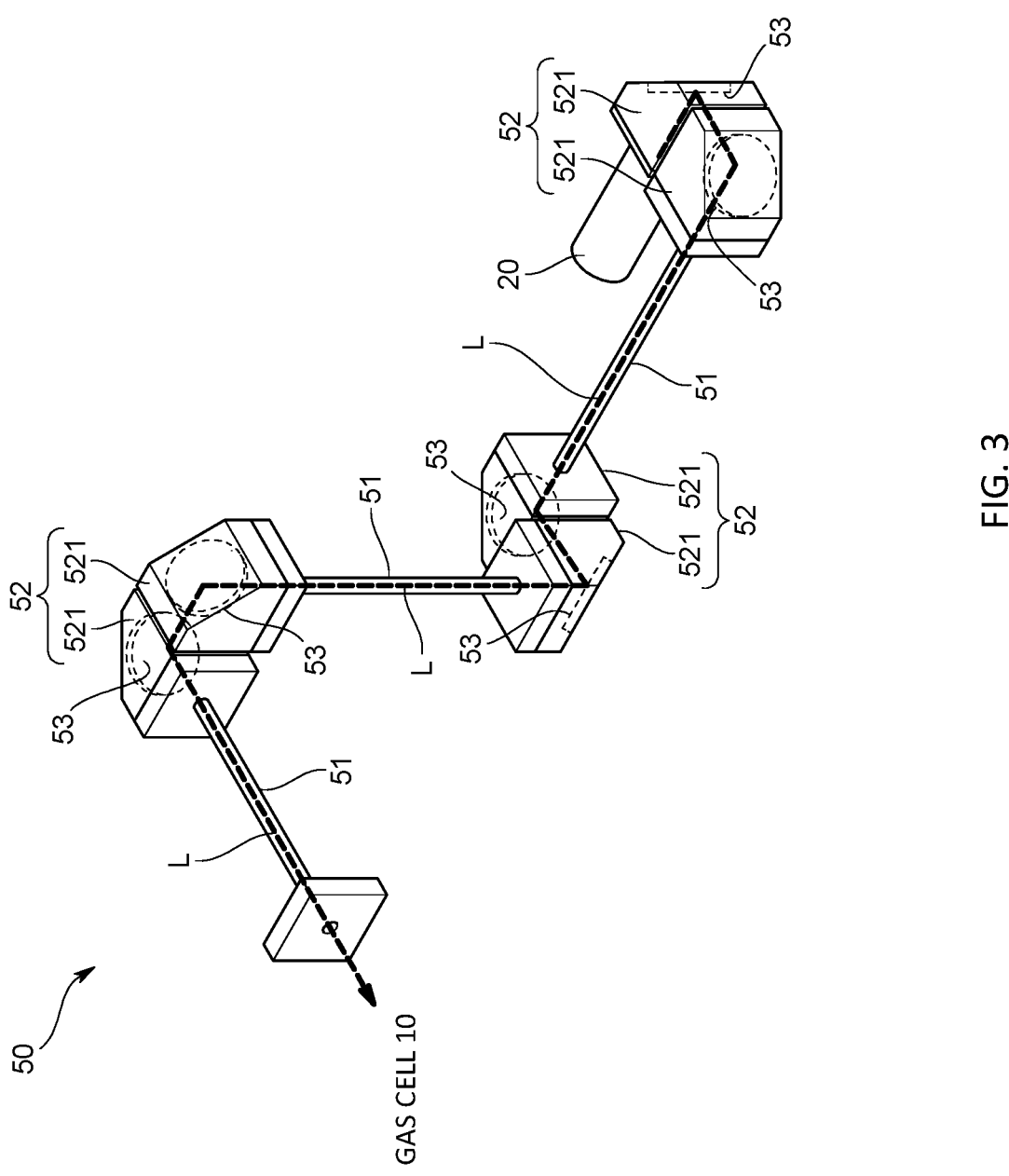
FIG. 3 is a perspective view illustrating a laser light transmission mechanism, included in the gas analysis device according to the embodiment.
Figure 4:
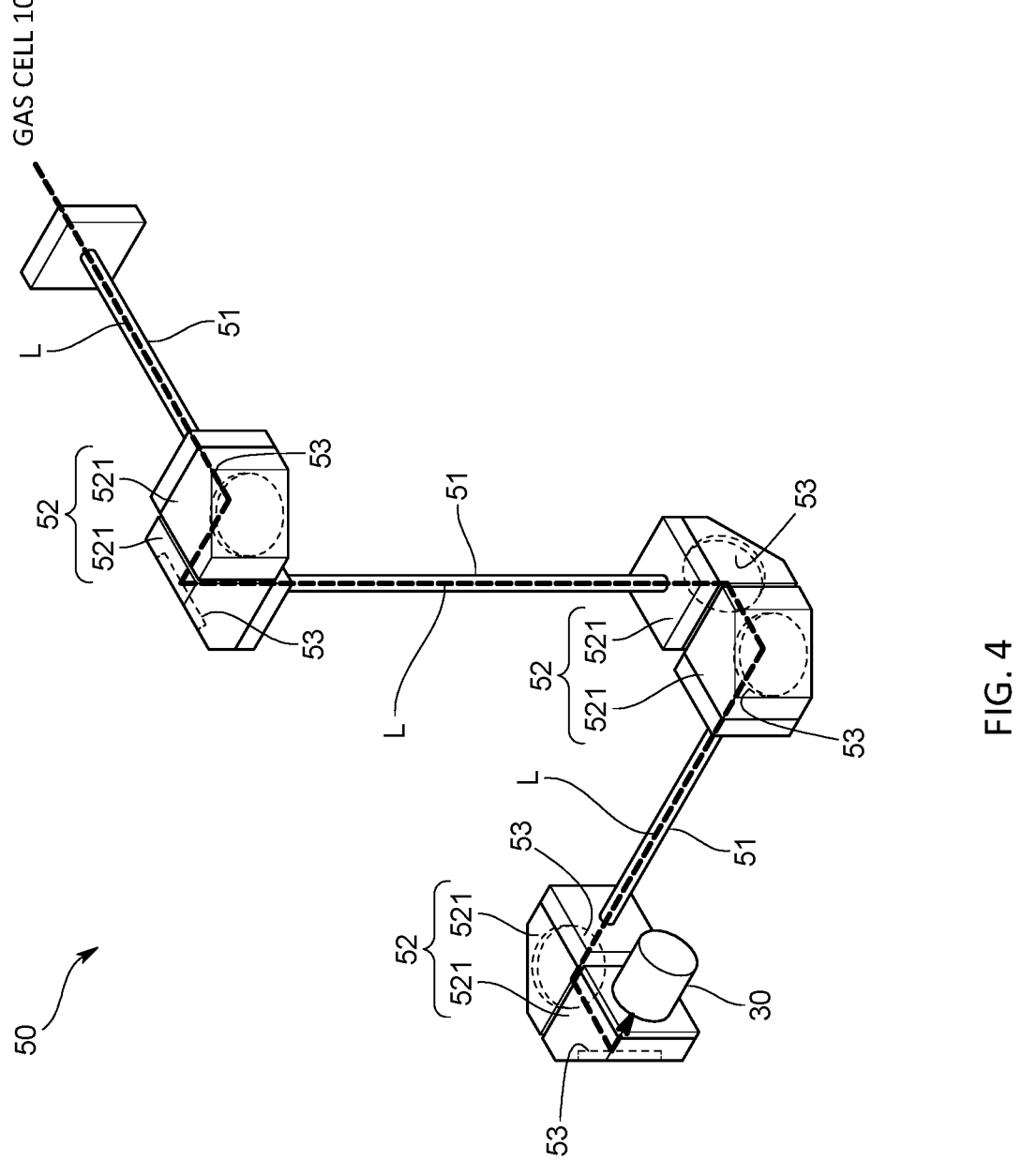
FIG. 4 is a perspective view illustrating a laser light transmission mechanism, included in the gas analysis device according to the embodiment.

As illustrated in FIGS. 2 to 4, the gas analysis device 100 includes a laser light transmission mechanism 50 formed by connecting a plurality of tubular members 51, and the inner space delineated by the tubular members 51 provides a light path L for the laser light.

More specifically, the laser light transmission mechanism 50 is configured to transmit laser light to a desired position, and guides the laser light having entered the tubular member 51 disposed on one side, to the tubular member 51 disposed on the other side.

In the present embodiment, as illustrated in FIGS. 2 to 4, laser light transmission mechanisms 50 are provided between the gas cell 10 and the laser source 20, and between the gas cell 10 and the photodetector 30, respectively.

As illustrated in FIGS. 2 and 3, the laser light transmission mechanism 50 interposed between the gas cell 10 and the laser source 20 guides the light emitted from the laser source 20 to the gas cell 10, and has the laser source 20 connected to the tubular member 51 disposed on one side, and the gas cell 10 connected to the tubular member 51 disposed on the other side.

As illustrated in FIGS. 2 and 4, the laser light transmission mechanism 50 interposed between the gas cell 10 and the photodetector 30 guides the light passed through the gas cell 10 to the photodetector 30, and has the gas cell 10 connected to the tubular member 51 disposed on one side, and the photodetector 30 connected to the tubular member 51 disposed on the other side.

As illustrated in FIGS. 3 and 4, the laser light transmission mechanism 50 includes the plurality of tubular members 51 described above, coupling mechanisms 52 coupling the tubular members 51, and reflection mirrors 53 provided inside the respective coupling mechanisms 52.

The inner space of the plurality of tubular members 51 provides the light path L of the laser light, as mentioned earlier. In other words, the laser light passes through the inner space formed by these tubular members 51 along the tube axis of these tubular members 51.

Specifically, the tubular member 51 has hardness at least enough not to be shaken by the convection of the air, and is a straight tube made of a metal such as SUS, PTFE (Teflon), or PFA (paraformaldehyde). Some or all of the plurality of tubular members 51 included in the laser light transmission mechanism 50 may have the same length, or all of the plurality of tubular members may have different lengths.

The light path L formed by these tubular members 51 has at least one bend. In other words, the plurality of tubular members 51 includes at least two tubular members 51 connected in such a manner that tube axes thereof intersect with each other.

In the present embodiment, as illustrated in FIG. 2, focusing on one of the tubular members 51, the tubular member 51 connected to the one end of the tubular member 51 of interest and the tubular member 51 connected to the other end of interest intersect with the tubular member 51 of interest, more specifically, intersect orthogonally with the tubular member 51 of interest. In this manner, a plurality of bends are formed in the light path L of the laser light in the present embodiment. However, some of the tubular members 51 adjacent to each other may be connected linearly, without intersecting with each other.

The coupling mechanism 52 is interposed between the tubular members 51 adjacent to each other, and couples the tubular members 51 in such a manner that the tube axes of the tubular members 51 intersect with each other at a predetermined intersecting angle.

More specifically, the coupling mechanism 52 has a pair of attachments 521 attached to ends of the tubular members 51 that are adjacent to each other, respectively.

Each of these attachments 521 has an inner space forming a part of the light path L of the laser light, and is a block body having a shape that is the same as that of the other, for example. The shape is, however, not limited thereto, and may be changed as appropriate. The pair of attachments 521 are also rotatable with respect to each other. By then rotating of one of the attachments 521 with respect to the other attachment 521, the intersection angle described above can be changed. In the present embodiment, the adjacent tubular members 51 are connected in such a manner that the tube axes are orthogonal to each other.

The reflection mirror 53 is interposed between the pair of tubular members 51 connected to each other with the coupling mechanism 52, and guides the laser light having passed through the inner space of one of the tubular members 51 to the inner space of the other tubular member 51.

In the present embodiment, the reflection mirror 53 is provided inside each attachment of the pair of attachments 521 described above. As a result, the laser light having passed through the inner space of one of the tubular members 51 is reflected twice by the pair of reflection mirrors 53, respectively, and then guided to the inner space of the other tubular member 51.

Although the reflection mirror 53 according to the present embodiment is disposed so as to reflect the laser light by 90 degrees, the reflection angle is not limited thereto and may be changed as appropriate. Furthermore, the laser light transmission mechanism 50 may include an adjustment mechanism (not illustrated) for adjusting the reflection angle of the reflection mirror 53.

Advantageous Effects Achieved by Present Embodiment

With the gas analysis device 100 having such a configuration, because the laser source 20 and the photodetector 30 are separated from the gas cell 10, it is possible to prevent the laser source 20 and the photodetector 30 from being exposed to a high temperature, and to ensure the measurement accuracy, even if the gas flowing through the gas cell 10 is highly heated.

Furthermore, even if highly heated gas produces convective updraft inside the casing C, because the inner space of the tubular member 51 provides the light path L of the laser light, it is possible to achieve a highly practical structure that minimizes the laser light transmission characteristics, compared with the conventional structure using the optical fiber that is caused to vibrate by the convective updraft or by ventilation for exhausting heat from the casing.

In addition, because the laser light transmission mechanism 50 has at least two tubular members 51 coupled to each other in such a manner that the tube axes intersect with each other, and the light path L formed by these tubular members 51 has at least one bend, the degree of freedom in the arrangement of the laser source 20 and the photodetector 30 can be improved. As a result, it is possible to provide the laser source 20 and the photodetector 30 at desired positions separated from the gas cell 10 in a small space inside the casing C.

Furthermore, because the laser light transmission mechanism 50 includes the reflection mirror 53 provided inside each of the coupling mechanisms 52, it is possible to improve the degree of freedom in designing the light path L of the laser light, capable of reflecting the laser light in different directions, using the reflection mirror 53.

Furthermore, because the pair of attachments 521 have the same shape, the manufacturing cost of the coupling mechanism 52 can be reduced.

OTHER EMBODIMENTS

For example, the coupling mechanism 52 according to the embodiment described above has the pair of attachments 521, but the coupling mechanism 52 may be configured to couple the tubular members 51 that are adjacent to each other via one attachment 521.

In such a configuration, a single reflection mirror 53 may be used in reflecting the light passed through the inner space of one of the tubular members 51 to the inner space of the other tubular member 51.

Figure 5:
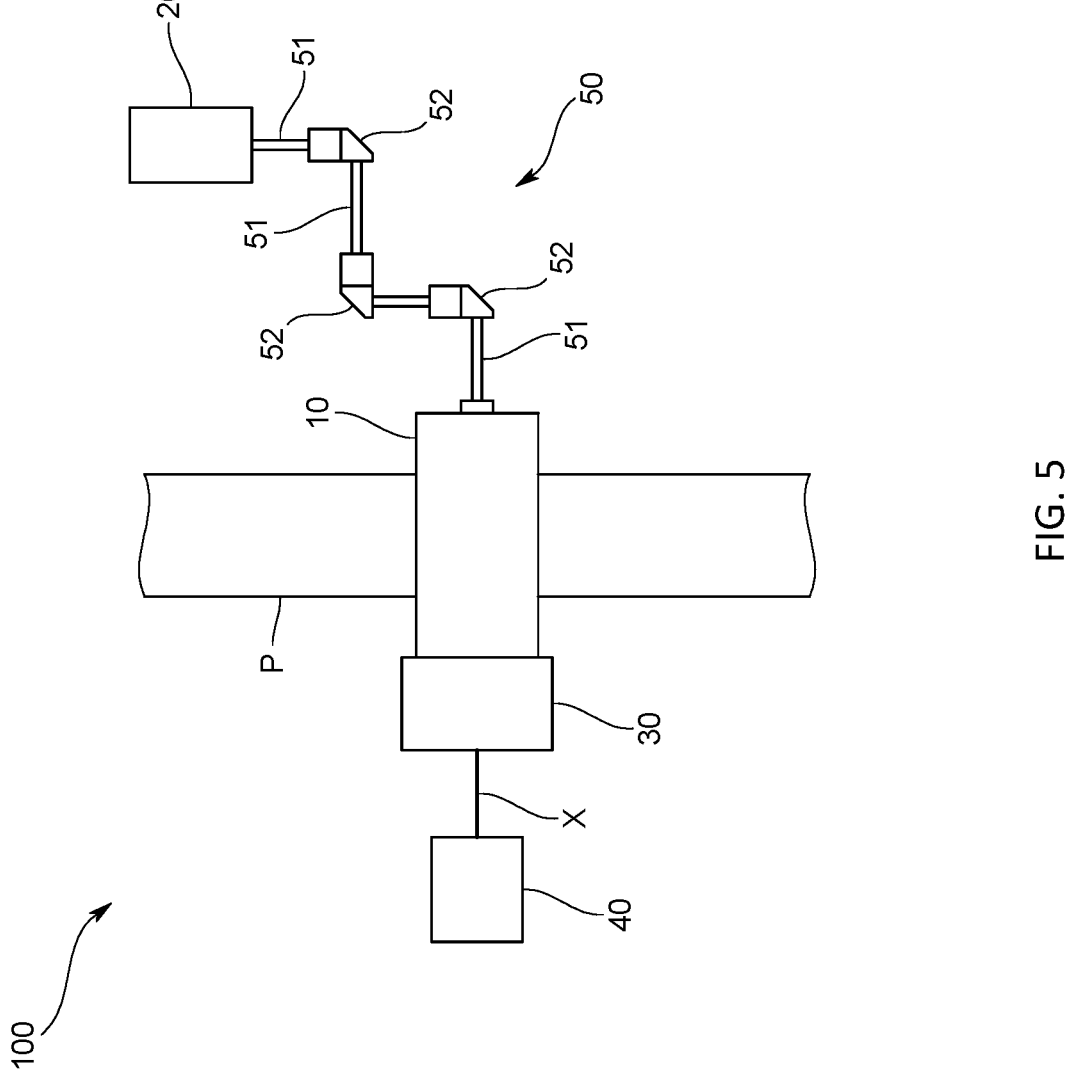
FIG. 5 is a schematic diagram illustrating a laser light transmission mechanism, included in a gas analysis device according to another embodiment.

In the embodiment above, a plurality of the laser light transmission mechanisms 50 are provided between the gas cell 10 and the laser source 20, and between the gas cell 10 and the photodetector 30, respectively. However, the laser light transmission mechanism 50 may be provided only in one of these spaces, and the other may be attached directly to the gas cell 10, for example, as illustrated in FIG. 5.

Furthermore, in order to stabilize the wavelength and the output of the laser light, a temperature-controlled gas may be circulated or be sealed inside the inner space of the tubular member 51. Note that the temperature-controlled gas is a gas other than the atmospheric air, and is a gas not absorbing the light in the wavelength range that is to be subjected to the measurement, and one example of the temperature-controlled gas is nitrogen gas.

When the component to be measured of the gas analysis device 100 is $H_2O$, $CO_2$, or the like contained in the atmospheric air, for example, the purge gas may be circulated or sealed in the inner space of the tubular member 51. A purge gas is a gas different from the atmospheric air, and does not contain a component to be measured. An example thereof includes nitrogen gas. In this manner, it is possible to clean the internal of the tubular member 51, and to make improvements such as in the maintainability.

Furthermore, for example, in an environment in which air valves are provided at desired positions of the pipe P, e.g., on the upstream side and the downstream side of the gas cell 10, a driving gas for driving the air valves may be circulated or sealed in the inner space of the tubular member 51. Examples of the driving gas include the atmospheric air and nitrogen gas.

Furthermore, the inner space of the tubular member 51 may be in a vacuum state.

In this manner, the vacuum, which has a heat insulating effect, can suppress the transfer of ambient heat to the internal of the tubular member 51, so that it is possible to reduce the thermal effect on (thermal fluctuation of) the laser light passing through the tubular member 51.

The term "vacuum state" as used herein is a concept including not only the complete vacuum but also a degree of vacuum capable of reducing the thermal effect on the laser light.

In addition, although the plurality of tubular members 51 provide the light path of the laser light in the embodiment described above, one tubular member 51 may provide the light path.

Figure 6:
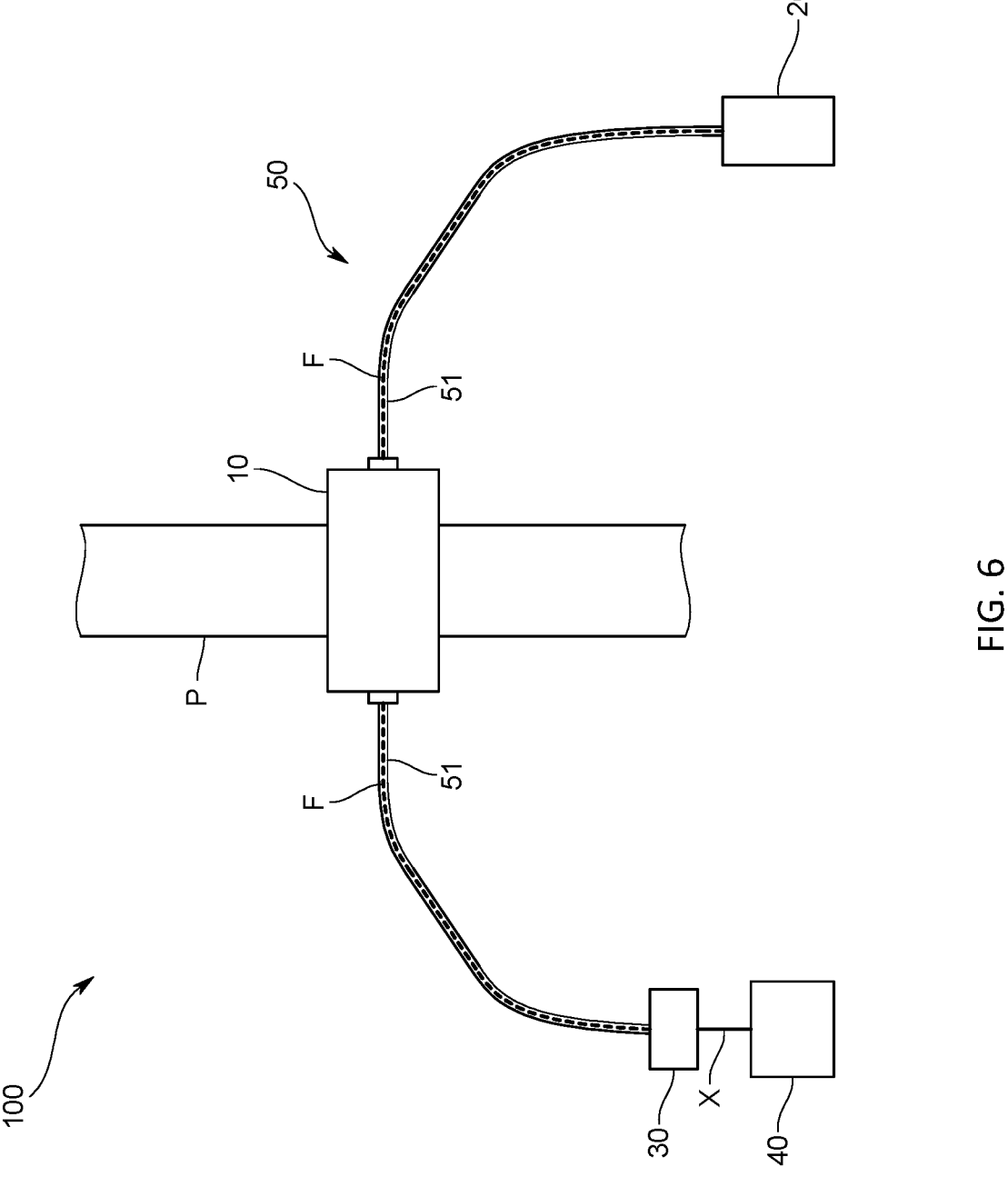
FIG. 6 is a schematic diagram illustrating a laser light transmission mechanism, included in the gas analysis device according to the other embodiment.

As illustrated in FIG. 6, the laser light transmission mechanism 50 may further include an optical fiber F provided in the inner space of the tubular member 51. In such a configuration, the optical fiber serves as the light path L of the laser light, formed in the inner space of the tubular member 51. In addition, the number of tubular members 51 included in the laser light transmission mechanism 50 may be one or more. More specifically, a possible embodiment includes one in which a straight tubular member is used for a straight part of the light path L, and a curved member is used for a curved part of the light path L.

With such a configuration, the reflection mirror 53 in the laser light transmission mechanism 50 according to the embodiment can be rendered unnecessary, and the configuration of the laser light transmission mechanism 50 can be simplified. Moreover, it is possible to prevent issues related to the use of the optical fiber F, that is, a change in the transmission characteristics due to shaking of the optical fiber F, and deterioration in the analysis accuracy due to the change in the transmission characteristics.

Furthermore, when the gas analysis device 100 includes a beam splitter that splits the laser light from the laser source 20 into a plurality of light paths L, a plurality of tubular members 51 may form the plurality of light paths L, respectively. With such a configuration, it is possible to establish various light paths depending on the objective of the analysis, e.g., using one of light paths L as a long light path where the light goes through multiple reflections inside the gas cell 10, and another light path L as a short light path in which the light does not go through multiple reflections.

Furthermore, electronic devices such as a circuit board for controlling the laser source 20 are more likely to experience a measurement error and a failure when the devices are exposed to a high temperature. Therefore, such electronic devices are preferably separated from the gas cell 10, and more preferably, also separated from the pipe P connected to the gas cell 10.

In addition, the gas analysis device 100 according to the present invention may be an analyzer using Fourier transform infrared spectroscopy (FTIR), non-dispersive infrared absorption (NDIR), or the like, for example.

In addition, various modifications and combinations of the embodiments may be made within the scope not deviating from the gist of the present invention.

INDUSTRIAL APPLICABILITY

According to the present invention, it is possible to provide a more practical gas analysis device than that having conventionally been, while keeping the laser source and the photodetector separated from the gas cell, thereby preventing exposure to a high temperature.

The invention claimed is:

1. A gas analysis device comprising:
   a gas cell;
   a laser source or a photodetector separated from the gas cell; and
   a laser light transmission mechanism provided between the gas cell and the laser source or the photodetector, wherein
   the laser light transmission mechanism includes a plurality of tubular members and a coupling mechanism,
   an inner space of the plurality of tubular members provides a light path for laser light,
   the coupling mechanism is disposed between adjacent tubular members of the plurality of tubular members and connects the adjacent tubular members so that their respective tube axis intersect at a prescribed crossing angle, and
   the coupling mechanism is configured to adjust the crossing angle.

2. The gas analysis device according to claim 1, wherein the gas cell is heated by a heating mechanism.

3. The gas analysis device according to claim 1, wherein the laser source or the photodetector separated from the gas cell is separated from a pipe connected to the gas cell.

4. The gas analysis device according to claim 1, wherein the gas cell is provided inside a casing of a semiconductor manufacturing device.

5. The gas analysis device according to claim 1, wherein the light path formed by the plurality of tubular members coupled to each other has at least one bend.

6. The gas analysis device according to claim 5, wherein the laser light transmission mechanism includes:
   a reflection mirror provided inside the coupling mechanism.

7. The gas analysis device according to claim 6, wherein the coupling mechanism has a pair of attachments having the same shape and attached to respective ends of the tubular members that are adjacent to each other, and the reflection mirror is provided inside each attachment included in the pair of attachments.

8. The gas analysis device according to claim 1, wherein the laser light transmission mechanism includes an optical fiber provided in the inner space of the tubular member, and forming the light path.

9. The gas analysis device according to claim 1, wherein both the laser source and the photodetector are separated from the gas cell, and a plurality of the laser light transmission mechanisms are provided between the gas cell and the laser source and between the gas cell and the photodetector, respectively.

10. The gas analysis device according to claim 1, wherein one or both of the laser source and the photodetector are housed inside a casing.

11. The gas analysis device according to claim 1, wherein a temperature-controlled gas is circulated through or is sealed in the inner space of the tubular member.

12. The gas analysis device according to claim 1, wherein a purge gas not containing the component to be measured is circulated through the inner space of the tubular member.

13. The gas analysis device according to claim 1, wherein the inner space of the tubular member is in a vacuum state.

14. The gas analysis device according to claim 1, further comprising a beam splitter that splits laser light from the laser source into a plurality of light paths, wherein the plurality of tubular members form the plurality of light paths, respectively.

15. A laser light transmission mechanism that is used in a gas analysis device including a gas cell and a laser source or a photodetector that is separated from the gas cell, and that is provided between the gas cell and the laser source or the photodetector, wherein the laser light transmission mechanism includes one or a plurality of tubular members, and an inner space of the one or the plurality of tubular members provides a light path for laser light, and an optical fiber disposed in the inner space, the optical fiber extending from the gas cell to the laser source or the photodetector, the tubular member continuously surrounding the optical fiber along an entire span between the gas cell and the laser source or the photodetector.

16. A gas analysis device comprising:

a gas cell;

a laser source or a photodetector separated from the gas cell;

a tubular member that connects the gas cell and the laser source or the photodetector and defines an inner space; and an optical fiber disposed in the inner space, the optical fiber extending from the gas cell to the laser source or the photodetector, the tubular member continuously surrounding the optical fiber along an entire span between the gas cell and the laser source or the photodetector.

* * * * *